(12) United States Patent
Wei et al.

(10) Patent No.: US 9,008,430 B2
(45) Date of Patent: Apr. 14, 2015

(54) IDENTIFICATION METHOD AND APPARATUS OF CONFUSABLE CHARACTER

(75) Inventors: Nannan Wei, Shandong (CN); Weiqiang Chen, Shandong (CN); Xin Liu, Shandong (CN); Wei Liu, Shandong (CN); Lei Pei, Shandong (CN); Xiaoman Wang, Shandong (CN)

(73) Assignee: Hisense TransTech Co., Ltd. (CN)

( * ) Notice: Subject to any disclaimer, the term of this patent is extended or adjusted under 35 U.S.C. 154(b) by 192 days.

(21) Appl. No.: 13/810,947

(22) PCT Filed: Dec. 27, 2010

(86) PCT No.: PCT/CN2010/080296
§ 371 (c)(1),
(2), (4) Date: Jan. 18, 2013

(87) PCT Pub. No.: WO2012/009931
PCT Pub. Date: Jan. 26, 2012

(65) Prior Publication Data
US 2013/0121581 A1    May 16, 2013

(30) Foreign Application Priority Data

Jul. 20, 2010    (CN) .......................... 2010 1 0236964

(51) Int. Cl.
*G06K 9/18*    (2006.01)
*G06K 9/68*    (2006.01)

(52) U.S. Cl.
CPC ................ *G06K 9/18* (2013.01); *G06K 9/6857* (2013.01); *G06K 2209/01* (2013.01)

(58) Field of Classification Search
None
See application file for complete search history.

(56) References Cited

U.S. PATENT DOCUMENTS

| 6,026,177 A | 2/2000 | Mong et al. |
| 2008/0144938 A1* | 6/2008 | Napper ........................ 382/186 |
| 2008/0285804 A1 | 11/2008 | Sefton |

FOREIGN PATENT DOCUMENTS

| CN | 101763505 A | 6/2010 |
| CN | 101916378 A | 12/2010 |
| JP | 2005-182236 A | 7/2005 |

OTHER PUBLICATIONS

Shyang-Lih Chang, Li-Shien Chen, Yun-Chung Chung, and Sei-Wan Chen, "Automatic License Plate Recognition", Mar. 2004, IEEE Transactions on Intelligent Transportation Systems, vol. 5, No. 1.*

*Primary Examiner* — Aaron W Carter
*Assistant Examiner* — Siamak Harandi
(74) *Attorney, Agent, or Firm* — DLA Piper LLP (US)

(57) ABSTRACT

An identification method and apparatus of confusable character are provided. The method involves: the detected character image is identified to gain the initial character information which is corresponding to the character image; the step change times of the corresponding external outline of the character image are counted if the initial character information is the confusable character; the final character information corresponding to the character image is confirmed according to the step change times; The final character information of the character image can be known conveniently according to the step change times, therefore the corresponding correct character information of the character image can be identified more precisely. The possibility of wrong identification of the character image because of the appearing confusable character can be reduced, and the identification precision rate of the confusable character can be improved.

6 Claims, 5 Drawing Sheets

IDENTIFICATION METHOD AND APPARATUS OF CONFUSABLE CHARACTER

The present application is a US National Stage of International Application No. PCT/CN2010/080296, filed 27 Dec. 2010, designating the United States, and claiming priority to Chinese Patent Application No. 201010236964.8 filed Jul. 20, 2010.

FIELD OF THE INVENTION

The present invention relates to the field of image recognition and particularly to a method and apparatus for recognizing a confusable character.

BACKGROUND OF THE INVENTION

At present, people have driven vehicles instead of walking and there are an increasing number of vehicles on roads along with their improving living levels. Monitoring devices are typically arranged on the roads over which the vehicles are driven to monitor the vehicles are driven to monitor the vehicles on the roads, where the monitoring devices generally obtain images of license plates of the vehicles for an image recognition system to recognize characters of the license plates. A monitoring system obtains image information of characters including Chinese characters, digits, letters, etc., in an image of a license plate. Particularly a line in an image of a character will appear as a step structure when the line is in an inclined or curved status, like the characters 8 and B with step structures at their curved sections as illustrated in FIG. 1. Characters with similar appearances frequently occur in an obtained image of a license plate, for example, 8 and B, 0 and D, 7 and 1, 7 and T, D and Q, 2 and Z and other confusable characters.

As can be apparent from above, since characters with similar appearances may occur in an image of a license plate, the confusable characters in the image of the license plate will appear more similar when the license plate is inclined or smeared so that the image recognition system can not recognize the characters in the image of the license plate accurately. Consequently it is difficult to recognize an image of a confusable character in an image of a license plate in the prior art.

SUMMARY OF THE INVENTION

Embodiment of the invention provide a method and apparatus for recognizing a confusable character so as to address the drawback in the prior art of being difficult to recognize an image of a confusable character to recognize an image of a confusable character conveniently and accurately and to improve the ratio of accurate recognition for the method for recognizing a confusable character.

An embodiment of the invention provides a method for recognizing a confusable character, which includes:

recognizing a detected character image to obtain initial character information corresponding to the character image;

calculating the number of changes in gradient corresponding to the character image if the initial character information is a confusable character; and determining final character information corresponding to the character image according to the number of changes in gradient.

An embodiment of the invention provides an apparatus for recognizing a confusable character, which includes:

a recognizing module configured to recognize a detected character image to obtain initial character information corresponding to the character image;

a calculating module configured to calculate the number of changes in gradient corresponding to the character image if the initial character information is a confusable character; and a determining module configured to determine final character information corresponding to the character image according to the number of changes in gradient.

In the method and apparatus for recognizing a confusable character according to the embodiments of the invention, it is determined whether the initial character information corresponding to the recognized character image is a confusable character, and in the case that the initial character information is determined as a confusable character, the number of changes in gradient corresponding to the character image is calculated, and then the final character information in the character image can be known conveniently from the number of changes in gradient to thereby recognize more accurately the correct character information corresponding to the character image and lower effectively the possibility of recognizing the character image wrongly due to the confusable character, thus recognizing the image of the confusable character conveniently and accurately and improving the ratio of accurate recognition for the method for recognizing a confusable character.

BRIEF DESCRIPTION OF THE DRAWINGS

In order to make the technical solutions according to the embodiments of the invention or in the prior art more apparent, the drawings to be used in the description of the embodiments or the prior art will be described briefly, and apparently the drawings to be described below illustrate some of the embodiments of the invention, and those ordinarily skilled in the art can further derive from these drawings other drawings without any inventive effort. In the drawings.

DETAILED DESCRIPTION OF THE EMBODIMENTS

In order to make the objects, technical solutions and advantages of the embodiments of the invention more apparent, the technical solutions in the embodiments of the invention will be described clearly and fully below with reference to the drawings in the embodiments of the invention, and apparently the embodiments to be described relate to a part but not all of the embodiments of the invention. Any other embodiments that can occur to those ordinarily skilled in the art without any inventive effort shall fall into the scope of the invention.

Figure 2:
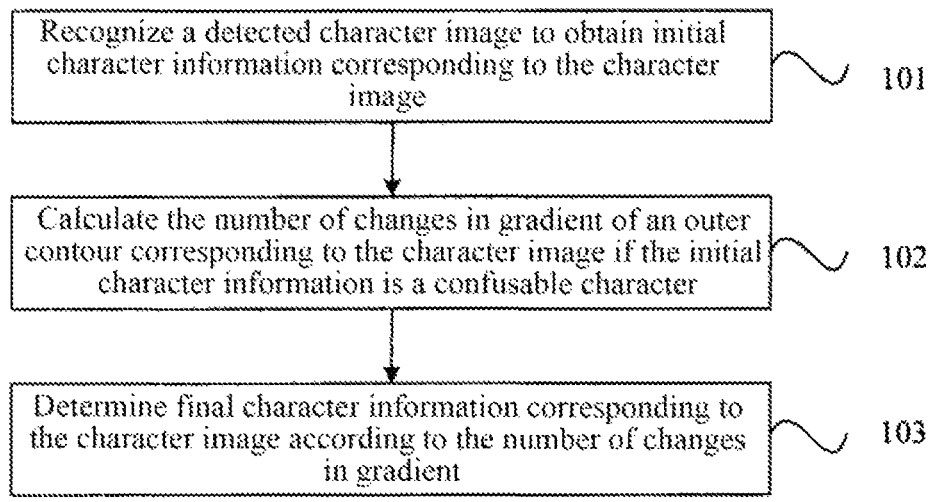
FIG. 2 is a flow chart of a first embodiment of a method for recognizing a confusable character among the embodiments of the invention.

FIG. 2 is a flow chart of a first embodiment of a method for recognizing a confusable character according to the invention. As illustrated in FIG. 2, the method for recognizing a confusable character according to this embodiment includes:

The step 101 is to recognize a detected character image to obtain initial character information corresponding to the character image.

Specifically the method for recognizing a confusable character in this embodiment will be described by way of an example in which a license plate image is detected as a character image. After a monitoring system on a road captures a character image of a license plate, the character image can be recognized through image recognition technical to thereby obtain initial character information corresponding to the character image. Particularly the initial character information obtained through image recognition technical can include letters, digits and other characters.

The step 102 is to calculate the number of changes in gradient of an outer contour corresponding to the character image if the initial character information is a confusable character.

Specifically after the initial character information corresponding to the character image is recognized in the step 101, it can be determined whether the initial character information is a confusable character. Particularly the confusable character is a character predetermined in real life, and a character library of confusable characters can be preset, and if the initial character information includes a letter, a digit or another character which is a character in the character library, then the initial character information can be determined as a confusable character. After the initial character information is determined as a confusable character, the number of changes in gradient included in an outer contour corresponding to the character image can be calculated in the step 102. The outer contour corresponding to the character image is constituted of lines appearing as step structures at their curved sections, and a character with a larger curvature of its line has a larger number of changes in gradient, so different characters have different numbers of changes in gradient.

The step 103 is to determine final character information corresponding to the character image according to the number of changes in gradient.

Specifically after the number of changes in gradient corresponding to the character image is calculated in the step 102, final character information actually corresponding to the character image can be determined finally according to the number of changes in gradient. For example, taking the confusable characters B and 8 as an example, since the character 8 has a larger curvature than that of the character B, when the initial character information in the character image corresponds to B or 8, final character information in the character image can be known conveniently from the calculated number of changes in gradient to thereby know accurately the correct character information in the character image and lower effectively the possibility of recognizing the character image wrongly due to the confusable character.

In the method for recognizing a confusable character according to this embodiment, it is determined whether the initial character information corresponding to the recognized character image is a confusable character, and in the case that the initial character information is determined as a confusable character, the number of changes in gradient corresponding to the character image is calculated, and then the final character information in the character image can be known conveniently from the number of changes in gradient to thereby recognize more accurately the correct character information corresponding to the character image and lower effectively the possibility of recognizing the character image wrongly due to the confusable character, thus recognizing the image of the confusable character conveniently and accurately and improving the ratio of accurate recognition for the method of recognizing a confusable character.

Figure 3A:
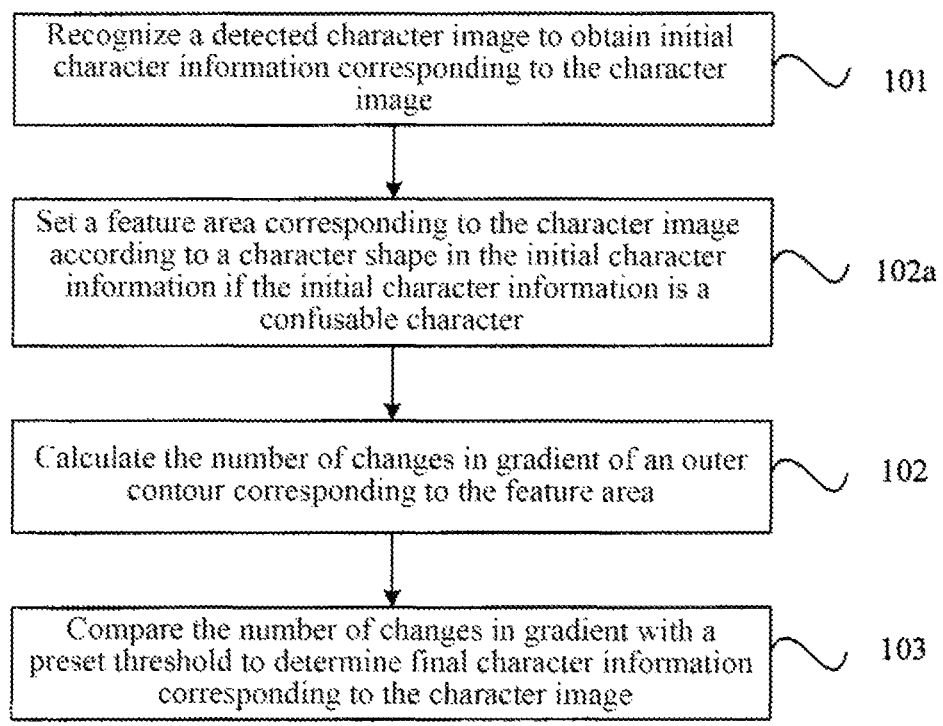
FIG. 3A is a flow chart of a second embodiment of a method for recognizing a confusable character among the embodiments of the invention.

FIG. 3A is a flow chart of a second embodiment of a method for recognizing a confusable character according to the invention. As illustrated in FIG. 3A, the second embodiment of a method for recognizing a confusable character according to the invention includes the step 101 and the step 103 in the first embodiment of the method for recognizing a confusable character according to the invention and differs from the first embodiment in that before the step 102, there are further included:

The step 102a is to set a feature area corresponding to the character image according to a character shape in the initial character information if the initial character information is a confusable character.

Specifically if a character in the initial character information is a confusable character, then a feature area corresponding to the image can firstly be set in the step 102a. In the step 102a, a feature area is set in the character image according to the specific shape of the character in the initial character information to include the shape feature specific to the confusable character corresponding to the initial character information. Particularly the feature area in this embodiment can include an upper part and/or a lower part of the character image. For example, taking the character 8 as an example, line structures of the top left corner and the bottom left corner of the contour of the character 8 are shape features specific to the character 8, so a feature area corresponding to the image of the character 8 can be set at the top left corner or the bottom left corner according to the character shape of the character 8 for more accurate calculation of the number of changes in gradient in the step 102. Furthermore for more accurate recognition of the character information in the character image, the feature area in this embodiment can further include a central part of the character image. Specifically taking the character 8 as an example, when the detected character image is in an inclined status or the character image is smeared seriously, it is impossible to detect very accurately whether the character 8 corresponding to the initial character information is correct simply by setting the feature area at the top left corner or the bottom left corner of the character 8, so the character B may be easily recognized wrongly as the character 8 when the character B is in an inclined status or smeared seriously, and therefore it is necessary to also set a feature area at the central part of the character 8 corresponding to the initial character information so that a plurality of feature areas are set for the character corresponding to the initial character information to thereby obtain the number of changes in gradient more accurately in the step 102 and further recognize the real character information in the character image more effectively. Furthermore for a different confusable character, a feature area or areas corresponding to the confusable character can be preset so that when the initial character information is determined as a confusable character, a feature area or areas corresponding to an image of a different confusable character can be set for the confusable character in the step 102a. For example, feature areas of 8 and B are set to the top left corner, the bottom left corner and the central part, feature areas of 2 and Z are set to the top right corner, etc.

Figure 3B:
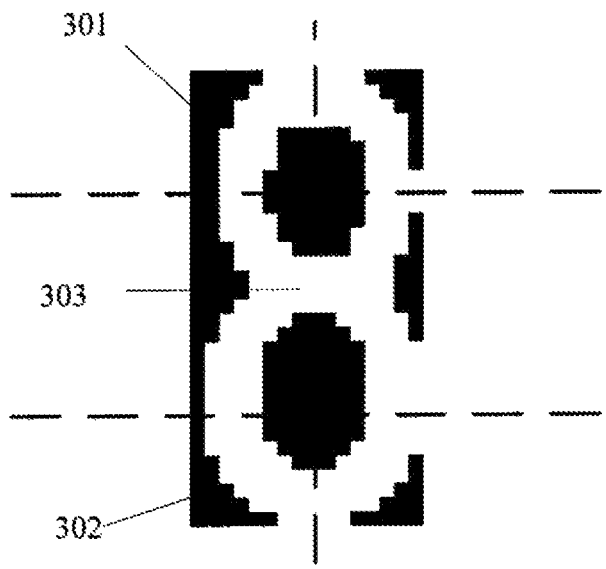
FIG. 3B, FIG. 3C and FIG. 3D are schematic diagrams of an image of a character in the embodiments of the invention.

For feature areas of the character 8, reference is made to areas denoted as 301, 302 and 303 in FIG. 3B, which correspond in that order to the top left corner, the bottom left corner and the central part.

Those skilled in the art can set a feature area or areas for a different confusable character, and the method for recognizing a confusable character in this embodiment will not be limited to any specific location at which and any specific way in which the feature area or areas are set.

The step 102 is particularly to calculate the number of changes in gradient of an outer contour corresponding to the feature area.

Specifically after the feature area is set in the step 102a, the number of changes in gradient is calculated for the character image in the feature area in the step 102 to thereby lower the amount of calculating the number of changes in gradient and obtain a more accurate number of changes in gradient.

In the method for recognizing a confusable character according to this embodiment, the feature area corresponding to the character image is set according to the character shape in the initial character information so that the number of changes in gradient included only in the feature area can be calculated to thereby lower effectively the amount of calculating the number of changes in gradient; and the number of changes in gradient in the feature area can be calculated to thereby reflect more accurately the feature information of the confusable character, thus recognizing the final character information in the character image more accurately and improving the ratio of accurate recognition for the method for recognizing a confusable character.

Figure 4:
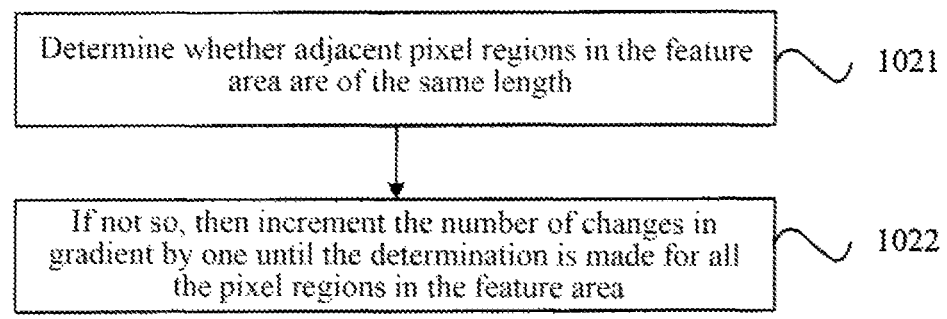
FIG. 4 is a specific flow chart of the step 102 in the second embodiment of a method for recognizing a confusable character among the embodiments of the invention.

Furthermore as illustrated in FIG. 4, the step 102 in this embodiment can include:

The step 1021 is to determine whether adjacent white pixel regions or adjacent black pixel regions in the feature area are of the same length.

Specifically the feature area in the character image is primarily composed of a plurality of white pixel regions and a plurality of black pixel regions, where the feature area can be divided into the white pixel regions and the black pixel regions in the longitudinal direction of the character image or in the transverse direction of the character image. Taking the character image being divided longitudinally as an example, when adjacent white pixel regions in the feature area are of different lengths, it can be known that the two adjacent white pixel regions form a step structure; and alike when adjacent black pixel regions in the feature area are of different lengths, it can be known that the two adjacent black pixel regions form a step structure.

Particularly for recognizing the character image, the character image is typically binarized so that the feature area in the character image is primarily consisted of a plurality of white pixel regions and a plurality of black pixel regions to thereby simplify the recognizing process and improve the accuracy of a recognition result.

Figure 1:
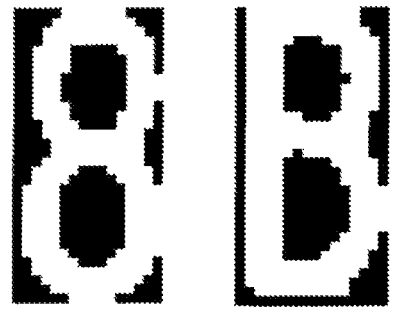
FIG. 1 is a schematic diagram of graphs of two confusable characters.

The white pixel region can be a background region, and at this time the black pixel region is a character region. Alternatively the white pixel region can be a character region, and at this time the black pixel region is a background region, as illustrated in FIG. 1.

Figure 3C:
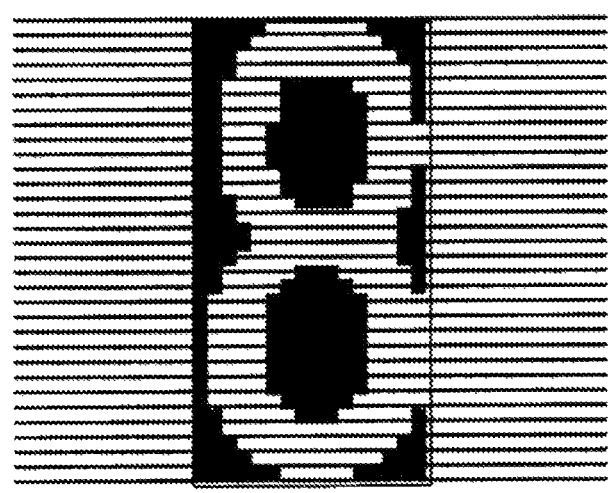
Figure 3D:
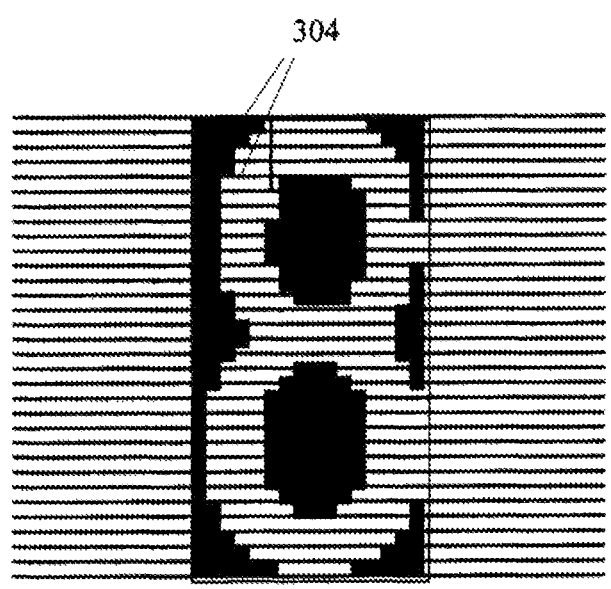

Taking the character image being divided longitudinally as an example, the character images are divided into regions as illustrated in FIG. 3C. A consecutive black segment in a row is a black pixel region. Adjacent black pixel regions refer to two black pixel regions which are consecutively longitudinally in two adjacent rows. Referring to two adjacent black pixel regions in the feature area denoted as 304 in FIG. 3D, when it is determined that the adjacent black pixel regions in the feature area are of different lengths (that is, there are different white-and-black transition locations across adjacent rows), it can be known that the two adjacent black pixel regions form a step structure.

If not so, then the step 1022 is to increment the number of changes in gradient by one until the determination is made for all the pixel regions in the feature area.

Specifically when it is known that the adjacent white pixel regions or black pixel regions are of different lengths, the number of changes in gradient is incremented by one, and the determination is further made in the step 1021 for the other adjacent pixel regions of the feature area until the determination is made for all the pixel regions in the feature area, where the final number of changes in gradient can be obtained.

If so, then the determination is further made in the step 1021 for the other adjacent pixel regions of the feature area until the determination is made for all the pixel regions in the feature area.

Or in the step 1021, the recognized (including binarized) character image is scanned per row or per column, and it is determined whether there is a change in pixel value. The character image is primarily constituted of a plurality of white pixel regions and a plurality of black pixel regions. Thus for scanning per pixel, there is a change in pixel value upon scanning from a white pixel region to a black pixel region or vice versa, that is, there is a change in pixel value at the location where a white pixel region and a black pixel region intersect. If there is a change, then the location where the change occurs is recorded; or if there is no change, then scanning proceeds until the entire character image is scanned. Thus the contour of the character in the character image can be obtained. For scanning per row, it is further determined whether the location where the change in pixel value occurs in the current row is in the same column as the location where the change in pixel value occurs in the previous row, and if so, then the determination is made for the next row; otherwise, the flow proceeds to the step 1022 of incrementing the number of changes in gradient, and then it is further determined whether the location where the change in pixel value occurs in the current row is in the same column as the location where the change in pixel value occurs in the previous row until the entire character image is scanned. For scanning per column, it is further determined whether the location where the change in pixel value occurs in the current column is in the same row as the location where the change in pixel value occurs in the previous column, and if so, then the determination is made for the next column; otherwise, the flow proceeds to the step 1022 of incrementing the number of changes in gradient, and then it is further determined whether the location where the change in pixel value occurs in the current column is in the same row as the location where the change in pixel value occurs in the previous column until the entire character image is scanned. Preferably it is determined starting from the location of the second record whether the location where the change in pixel value occurs is in the same row (or the same column) as that of the previous row.

Preferably the scanning scope is limited to the feature area, the recognized feature area is scanned per row (or per column), and it is determined whether there is a change in pixel value. If there is a change, then the location where the change occurs is recorded, scanning of this row (or this column) is terminated, and the next row (or the next column) is further scanned; otherwise, the next row (or the next column) is further scanned until the entire feature area is scanned. Then it is further determined whether the location where the change in pixel value occurs in the current row is in the same row (or the same column) as the location where the change in pixel value occurs in the previous row, and if so, then the determination is further made for the next row (or the next column); otherwise, the flow proceeds to the step 1022 of incrementing the number of changes in gradient by one until the entire feature area is scanned. Thus an accurate number of changes in gradient can be obtained and the scanning and determining processes can be simplified.

Furthermore in the step 103 of this embodiment, the number of changes in gradient can be compared with a preset threshold to determine final character information corresponding to the character image. Specifically a threshold can be preset, and the number of changes in gradient can be compared with the threshold to determine final character information corresponding to the character image. Particularly a preset threshold can be set correspondingly for each confusable character; and after the number of changes in gradient corresponding to the initial character information is obtained in the step 102, the number of changes in gradient can be compared with the threshold corresponding to a confusable character included in the initial character information to thereby obtain the final character information in the character image conveniently and accurately. For example, taking the initial character information being the character 8 as an example, 8 and B are confusable characters of each other, and when the number of changes in gradient is above a threshold, then final character information in the character image can be determined as 8; otherwise, final character information in the character image can be determined as B.

Those ordinarily skilled in the art can appreciate that all or a part of the steps in the embodiments of the method described above can be performed by program instructing relevant hardware, and the program can be stored in a computer readable storage medium and upon being executed perform the steps of the embodiments of the method described above; and the storage medium includes an ROM, an RAM, a magnetic disk, an optical disk and various other mediums capable of storing program codes.

Figure 5:
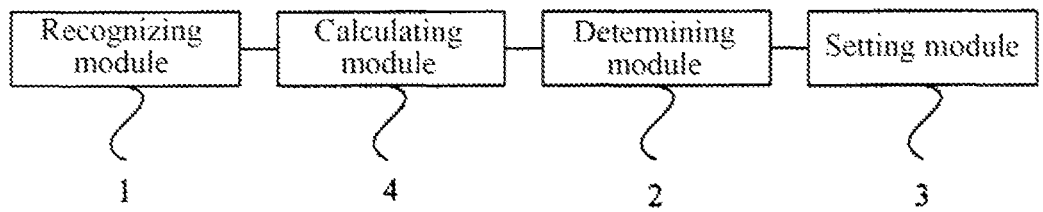
FIG. 5 is a schematic structural diagram of an embodiment of the apparatus for recognizing a confusable character among the embodiments of the invention.

FIG. 5 is a schematic structural diagram of an embodiment of the apparatus for recognizing a confusable character according to the invention. As illustrated in FIG. 5, the apparatus for recognizing a confusable character according to this embodiment includes a recognizing module 1, a calculating module 2 and a determining module 3.

The recognizing module 1 is configured to recognize a detected character image to obtain initial character information corresponding to the character image;

The calculating module 2 is configured to calculate the number of changes in gradient of an outer contour corresponding to the character image if the initial character information is a confusable character; and The determining module 3 is configured to determine final character information corresponding to the character image according to the number of changes in gradient.

Specifically reference can be made to the description of the embodiments of the method for recognizing a confusable character according to the invention for specific operating processes of the recognizing module 1, the calculating module 2 and the determining module 3 in this embodiment, and a repeated description thereof will be omitted here.

In the apparatus for recognizing a confusable character according to this embodiment, it is determined whether the initial character information corresponding to the recognized character image is a confusable character, and in the case that the initial character information is determined as a confusable character, the number of changes in gradient corresponding to the character image is calculated, and then the final character information in the character image can be known conveniently from the number of changes in gradient to thereby recognize more accurately the correct character information corresponding to the character image and lower effectively the possibility of recognizing the character image wrongly due to the confusable character, thus recognizing the image of the confusable character conveniently and accurately and improving the ratio of accurate recognition for the apparatus for recognizing a confusable character.

Based upon the foregoing technical solution, optionally the apparatus for recognizing a confusable character according to this embodiment further includes: a setting module 4 configured to set a feature area corresponding to the character image according to a character shape in the initial character information if the initial character information is a confusable character, and the calculating module 2 is configured to calculate the number of changes in gradient of the outer contour corresponding to the feature area. Specifically the setting module 4 sets the feature area corresponding to the character image according to the character shape in the initial character information so that the calculating module 2 can calculate the number of changes in gradient included only in the feature area to thereby lower effectively the amount of calculating the number of changes in gradient; and the number of changes in gradient in the feature area can be calculated to thereby reflect more accurately the feature information of the confusable character, thus recognizing the final character information in the character image more accurately and improving the ratio of accurate recognition for the apparatus for recognizing a confusable character.

Figure 6:
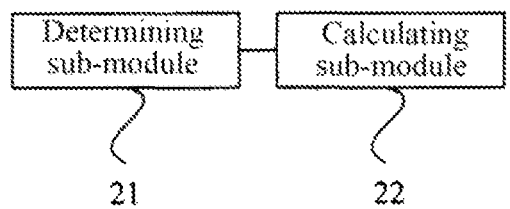
FIG. 6 is a schematic structural diagram of a calculating module in the embodiment of the apparatus for recognizing a confusable character among the embodiments of the invention.

Furthermore as illustrated in FIG. 6, the calculating module 2 in this embodiment can include a determining sub-module 21 and a calculating sub-module 22. The determining sub-module 21 is configured to determine whether adjacent white pixel regions or adjacent black pixel regions in the feature area are of the same length; and the calculating sub-module 22 is configured to increment the number of changes in gradient by one if the determining sub-module 21 determines that adjacent white pixel regions or adjacent black pixel regions are of different lengths until the determination is made for all the pixel regions in the feature area. Specifically when the determining sub-module 21 determines that the adjacent white pixel regions or black pixel regions are of different lengths, the calculating sub-module 22 increments the number of changes in gradient by one, and the determining sub-module 21 further makes the determinations for the other adjacent pixel regions of the feature area until the determination is made for all the pixel regions in the feature area, where the calculating sub-module 22 can obtain the final number of changes in gradient.

Furthermore the determining module 3 in this embodiment is further configured to compare the number of changes in gradient with a preset threshold to determine the final character information corresponding to the character image. Specifically the threshold can be preset, and the determining module 3 compares the number of changes in gradient with the threshold to determine the final character information corresponding to the character image.

It shall be noted that the foregoing embodiments are merely intended to illustrate but not to limit the technical solutions of the invention; and although the invention has been detailed with reference to the foregoing embodiments, those ordinarily skilled in the art shall appreciate that the technical solutions described in the foregoing respective embodiments can be modified or a part of the technical features thereof can be substituted equivalently for without having the essence of the corresponding technical solutions depart from the spirit and scope of the technical solutions in the respective embodiments of the invention.

The invention claimed is:

1. A method of recognizing a confusable character, comprising:
    recognizing, by a processor, a detected character image to obtain initial character information corresponding to the character image;
    setting, by the processor, a feature area corresponding to the character image according to a character shape in the initial character information if the initial character information is a confusable character, and
    calculating, by the processor, the number of changes in gradient corresponding to the feature area; and
    determining, by the processor, final character information corresponding to the character image according to the number of changes in gradient;
    wherein calculating the number of changes in gradient corresponding to the feature area comprises:
    calculating the number of times that adjacent white pixel regions or adjacent black pixel regions among regions into which the feature area is divided are of different lengths as the number of changes in gradient corresponding to the feature area; or
    scanning the feature area per row, recording the locations of white-and-black transitions, and counting the number of times that the locations of white-and-black transitions are not in the same column across two adjacent rows as the number of changes in gradient corresponding to the feature area; or
    scanning the feature area per column, recording the locations of white-and-black transitions, and counting the number of times that the locations of white-and-black transitions are not in the same row across two adjacent columns as the number of changes in gradient corresponding to the feature area.

2. The method for recognizing a confusable character according to claim 1, wherein the feature area comprises an upper part and/or a lower part of the character image.

3. The method for recognizing a confusable character according to claim 2, wherein the feature area further comprises a central part of the character image.

4. The method for recognizing a confusable character according to claim 1, wherein the determining final character information corresponding to the character image according to the number of changes in gradient further comprises:
    comparing the number of changes in gradient with a preset threshold to determine the final character information corresponding to the character image.

5. An apparatus that recognizing recognizes a confusable character, comprising a memory and a processor, wherein the memory stores program code, and the program code is executable by the processor to implement:
    a recognizing module configured to recognize a detected character image to obtain initial character information corresponding to the character image;
    a setting module configured to set a feature area corresponding to the character image according to a character shape in the initial character information if the initial character information is a confusable character;
    a calculating module configured to calculate the number of changes in gradient corresponding to the feature area; and
    a determining module configured to determine final character information corresponding to the character image according to the number of changes in gradient, wherein the calculating module comprises:
        a determining sub-module configured determine whether adjacent white pixel regions or adjacent black pixel regions in the feature area are of the same length; and
        a calculating sub-module configured to increment the number of changes in gradient by one if the determining sub-module determines that adjacent white pixel regions or adjacent black pixel regions are of different lengths until the determination is made for all the pixel regions in the feature area.

6. The apparatus for recognizing a confusable character according to claim 5, wherein the determining module is further configured to compare the number of changes in gradient with a preset threshold to determine the final character information corresponding to the character image.

* * * * *